(Model.) 2 Sheets—Sheet 1.

G. H. BRADLEY.
SEED COTTON CLEANER.

No. 255,486. Patented Mar. 28, 1882.

WITNESSES
Franck L. Ourand
Wm L. Speiden

INVENTOR
George H. Bradley
By J. G. Zachry
Attorney (Model.)

2 Sheets—Sheet 2.

G. H. BRADLEY.
SEED COTTON CLEANER.

No. 255,486.  Patented Mar. 28, 1882.

WITNESSES
Franck L. Ourand
Wm L. Speiden.

INVENTOR
George H. Bradley
By J. G. Zachry
Attorney

UNITED STATES PATENT OFFICE.

GEORGE H. BRADLEY, OF ATLANTA, GEORGIA, ASSIGNOR OF FIVE-SIXTHS TO J. W. GOLDSMITH, R. J. LOWRY, J. M. GOLDSMITH, T. D. MEADOR, AND C. D. MEADOR, OF SAME PLACE.

SEED-COTTON CLEANER.

SPECIFICATION forming part of Letters Patent No. 255,486, dated March 28, 1882.

Application filed January 20, 1882. (Model.)

*To all whom it may concern:*

Be it known that I, GEORGE H. BRADLEY, a citizen of the United States, residing at Atlanta, in the county of Fulton, State of Georgia, have invented a new and useful Improvement in Seed-Cotton Cleaners, of which the following is a specification.

My invention relates to improvements in seed-cotton cleaners, the cleaning being accomplished by the suction of all impurities from the cotton after it has been sufficiently agitated, the broad principle of which of course I admit to be old.

The objects of my improvement are to supply to the market a machine more simple in construction, cheaper, and better adapted to general use than all other machines for the same purpose involving any or a like principle. I attain these objects by the mechanism illustrated in the accompanying drawings, in which—

Figure 1:
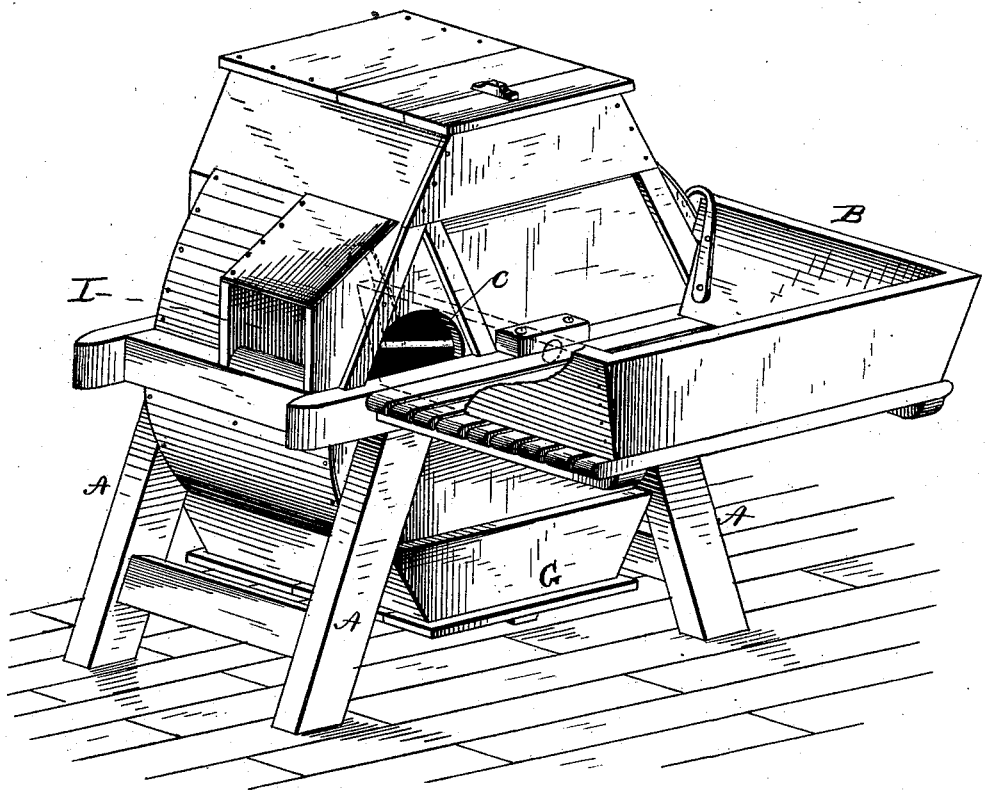
Figure 2:
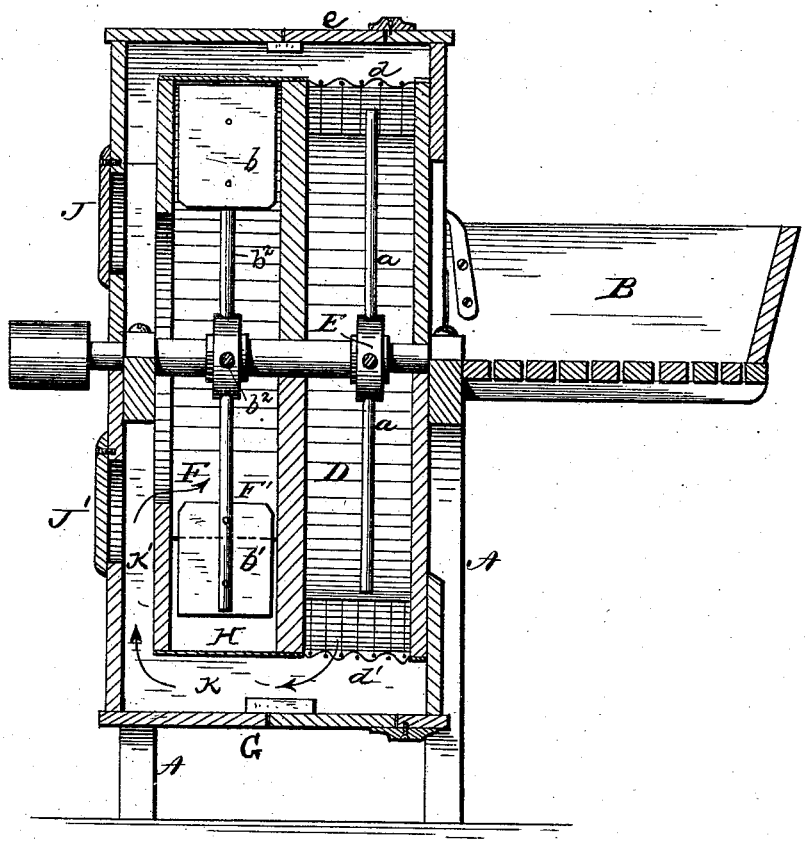

Figure 1 represents a perspective view of the entire machine, while Fig. 2 represents a vertical section of the same.

Similar letters refer to similar parts throughout the several views.

A A represent the standards, which support the whole machine.

B represents the hopper into which the cotton is deposited for cleaning. The bottom of this hopper is composed of slats, with intervening spaces for the escape of dust and other impurities that fall from the cotton while in the hopper and in the process of being fed to the cleaner.

C is the opening through which the cotton is passed into the beating-chamber D. This chamber, with its smooth inner surface, is lined with sheet-iron or other suitable material, save a small space in the center of the upper and lower part of said chamber, which small spaces $d\ d'$ (the latter thus forming a part of the inner surface of the beating-chamber) are made of net-work, to allow the escape of all dust, trash, and other impurities from the chamber after their separation from the cotton. Within this chamber, and upon the only shaft used in this device, is a hub, E, with "spokes" $a\ a\ a$, &c., as I in this connection term them. By the side of this chamber is a fan-chamber, F, into which the sand, trash, dust, and other impurities are sucked from the beating-chamber through the outlets of net-work and flues or passages K K', as indicated by arrows in Fig. 2, connecting the two chambers working in connection with each other. The fan F', operating in said fan-chamber, produces a suction, which draws through said flues connecting the two chambers all impurities from the cotton after it has been beaten and deposits said impurities part into a sand-box, G, and the remainder is caused to pass out through a flue, H, at the bottom and rear of the fan-chamber.

The fan-arms $b^2$, &c., are constructed of iron or other suitable material after the manner of the beaters, save the addition of the fan-leaves $b\ b'$ to the former. In the side of this fan-chamber are valves J J', through which air is admitted, and which serve to increase or diminish the draft at pleasure, and thus facilitate the regulation of the discharge of the cotton. On ordinary occasions, and when the cotton is dry, the valves may be closed; but when the cotton is damp, resisting by its heaviness expulsion, the valves may be opened and the cotton easily expelled from the beating chamber. The cotton is discharged from the beating-chamber through an aperture, I, in the front of said chamber, and near the opening C, through which the cotton passes into this chamber.

The operation of this device is as follows: The cotton, after being put into the hopper, passes from the same into the beating-chamber, where it is beaten and knocked to pieces by the beaters, while through the wire portion $d$ and the detachable cap $e$ immediately above there is allowed to pass air for the ventilation and the cleaning of the cotton, after which the air is drawn from this chamber into the fan-chamber, while the dust, sand, and other impurities pass with it and are discharged into the sand-box and out at rear flue of the fan-chamber. The smooth inner surface of the beating-chamber does not catch and destroy the fiber of the cotton while it is undergoing the whipping operation.

What I claim as my invention, and desire to secure by Letters Patent, is—

5   In a seed-cotton cleaner, the combination of a beating-chamber having a smooth inner surface and whipping means, a fan-chamber having a suction-fan, and the connecting-flues, substantially as described, and for the purposes set forth.

GEO. H. BRADLEY.

Witnesses:
  C. D. MEADOR,
  J. W. CARTER.